(12) United States Patent
Amini et al.

(10) Patent No.: US 8,233,494 B2
(45) Date of Patent: Jul. 31, 2012

(54) HIERARCHICAL AND INCREMENTAL MULTIVARIATE ANALYSIS FOR PROCESS CONTROL

(75) Inventors: Lisa Amini, Yorktown Heights, NY (US); Edward Sumner Begle, Howells, NY (US); Brian Douglas Pfeifer, Lagrangeville, NY (US); Deepak S. Turaga, Nanuet, NY (US); Olivier Verscheure, Hopewell Junction, NY (US); Justin Wai-chow Wong, South Burlington, VT (US); Gerett Raybourn Yocum, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 12/017,757

(22) Filed: Jan. 22, 2008

(65) Prior Publication Data

US 2009/0185493 A1    Jul. 23, 2009

(51) Int. Cl.
    *H04L 12/28*    (2006.01)
(52) U.S. Cl. .................................................. 370/408
(58) Field of Classification Search .............. 370/400, 370/408, 535, 537–541; 700/108–121
    See application file for complete search history.

(56) References Cited

U.S. PATENT DOCUMENTS

| | | | |
|---|---|---|---|
| 5,161,110 A | 11/1992 | Dorchak | |
| 5,239,456 A | 8/1993 | Badavas et al. | |
| 6,442,445 B1 | 8/2002 | Bunkofske et al. | |
| 6,456,899 B1 | 9/2002 | Gleason et al. | |
| 6,584,368 B2 | 6/2003 | Bunkofske et al. | |
| 6,658,640 B2 | 12/2003 | Weed | |
| 6,678,569 B2 | 1/2004 | Bunkofske et al. | |
| 6,826,298 B1 | 11/2004 | O'Dell et al. | |
| 6,879,871 B2 * | 4/2005 | Grasshoff et al. | 700/121 |
| 6,980,873 B2 | 12/2005 | Shen | |
| 7,062,417 B2 | 6/2006 | Kruger et al. | |
| 7,099,729 B2 | 8/2006 | Tai et al. | |
| 7,233,835 B2 * | 6/2007 | Good et al. | 700/108 |
| 7,613,572 B2 * | 11/2009 | Ben-Gal et al. | 702/19 |
| 7,783,372 B2 * | 8/2010 | Flach et al. | 700/108 |
| 2003/0216887 A1 | 11/2003 | Shieh | |
| 2005/0033550 A1 | 2/2005 | Macaluso et al. | |
| 2009/0276077 A1 * | 11/2009 | Good et al. | 700/110 |

OTHER PUBLICATIONS

P. Domingos et al., "Mining High-Speed Data Streams," Proceedings of the sixth ACM SIGKDD international Conference on Knowledge Discovery and Data Mining, 2000, 10 pages.

G. Qu et al., "Wafer Defect Detection Using Directional Morphological Gradient Techniques," EURASIP Journal on Applied Signal Processing, 2002, pp. 686-703, vol. 7.

(Continued)

*Primary Examiner* — Thai Hoang
(74) *Attorney, Agent, or Firm* — William J. Stock; Ryan, Mason & Lewis, LLP

(57) ABSTRACT

A technique for analyzing two or more data streams respectively generated from two or more components of a controllable process includes the following steps. In a first step, a statistical analysis is performed on each of the two or more data streams to generate first analysis results in the form of respective statistical results for the two or more data streams. In a second step, at least a portion of the statistical results from at least one of the two or more data streams is combined with at least a portion of the statistical results from at least another one of the two or more data streams to yield second analysis results. The controllable process is adjustable based on at least one of the first analysis results and the second analysis results.

20 Claims, 5 Drawing Sheets

OTHER PUBLICATIONS

M. Rencher et al., "Design-Aware Verification of Layout Patterning," Design for Yield, http://www.mentor.com/products/dft/news/articles/upload/inside_eedesign7.pdf, pp. 43-46.

A. Skumanich et al., "Advanced Interconnect Process Development Utilizing Wafer Inspection with "On-the-Fly" Automatic Defect Classification," IEEE/SEMI Advanced Semiconductor Manufacturing Conference, 1999, pp. 259-264.

T. Bearda et al., "The Effect of Backside Particles on Substrate Topography," Japanese Journal of Applied Physics, 2005, pp. 7409-7413, vol. 44, No. 10.

\* cited by examiner

400

500

| PREDICTED →<br>TRUE LABEL ↓ | BAD | EXCELLENT | ACCURACY |
|---|---|---|---|
| BAD | 52 | 6 | 89.65% |
| EXCELLENT | 7 | 51 | 87.9% |

600

HIERARCHICAL AND INCREMENTAL MULTIVARIATE ANALYSIS FOR PROCESS CONTROL

FIELD OF THE INVENTION

The present invention relates to process control and, more particularly, to hierarchical and incremental multivariate analysis for use in such process control.

BACKGROUND OF THE INVENTION

In the semiconductor manufacturing process environment, there are several different distributed data monitors used to gather information (typically in the form of data streams) about different steps in the manufacturing process, tool operation, wafer defects, test results, etc. Significant improvements in the performance of this manufacturing process are achieved by appropriately analyzing the available streams using statistical techniques, and using this to drive process control.

There has been a large amount of work on developing the appropriate statistical analytic solutions for different kinds of gathered data. An important statistical process control (SPC) method uses multivariate analysis on the time series and thresholds the resulting summary statistics to detect out-of-specification tool parameters, and uses this to control the tool operation. However, most of these schemes perform analysis on data gathered from one tool, i.e., analysis is performed on a data stream from one tool at a time. This leads to limitations in the SPC performance, as it deters cross-tool, cross-step, and cross-data-source analysis.

SUMMARY OF THE INVENTION

Principles of the invention provide hierarchical and incremental statistical analysis for use in such process control.

By way of example, in a first aspect of the invention, a method for analyzing two or more data streams respectively generated from two or more components of a controllable process comprises the following steps. In a first step, a statistical analysis is performed on each of the two or more data streams to generate first analysis results in the form of respective statistical results for the two or more data streams. In a second step, at least a portion of the statistical results from at least one of the two or more data streams is combined with at least a portion of the statistical results from at least another one of the two or more data streams to yield second analysis results. The controllable process is adjustable based on at least one of the first analysis results and the second analysis results.

The statistical analysis may comprise a multivariate analysis. The first analysis results may comprise incremental summary statistics for each of the two or more data streams. The second analysis results may comprise hierarchical summary statistics for the two or more data streams. The hierarchical summary statistics for the two or more data streams may be computed using a decision tree classifier. The decision tree may be usable to adjust one or more components of the controllable process. In one embodiment, the controllable process comprises a semiconductor manufacturing process, e.g., a silicon wafer manufacturing process.

In a second aspect of the invention, an article of manufacture for analyzing two or more data streams respectively generated from two or more components of a controllable process comprises a computer readable storage medium including one or more programs which when executed by a computer perform the above described first (intermediate analysis) and second (hierarchical analysis) steps.

In a third aspect of the invention, apparatus for analyzing two or more data streams respectively generated from two or more components of a controllable process comprises: a memory; and a processor coupled to the memory and operative to: (i) perform a statistical analysis on each of the two or more data streams to generate first analysis results in the form of respective statistical results for the two or more data streams; and (ii) combine at least a portion of the statistical results from at least one of the two or more data streams with at least a portion of the statistical results from at least another one of the two or more data streams to yield second analysis results; wherein the controllable process is adjustable based on at least one of the first analysis results and the second analysis results.

In a fourth aspect of the invention, a system for analyzing two or more data streams respectively generated from two or more tools of a semiconductor processing pipeline comprises the following elements. A data storage unit stores the two or more data streams. A statistical analyzer is coupled to the data storage unit and operative to: (i) perform a multivariate analysis on each of the two or more data streams to generate first analysis results in the form of respective statistical results for the two or more data streams; and (ii) combine at least a portion of the statistical results from at least one of the two or more data streams with at least a portion of the statistical results from at least another one of the two or more data streams to yield second analysis results; wherein at least a portion of the two or more tools of the semiconductor processing pipeline is adjustable based on at least one of the first analysis results and the second analysis results.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Illustrative embodiments of the invention will be described below in the context of statistical process control (SPC) in a semiconductor manufacturing process. However, it is to be understood that the principles of the invention are not limited thereto and may be used in applications other than a semiconductor manufacturing process. It should also be understood that the invention is not limited to the particular materials, features, processing steps, and applications shown and described herein.

In order to improve performance of the SPC and, in the context of the illustrative semiconductor processing embodiment, the resulting wafer yield, we propose to perform multivariate analysis across several of the available data streams to identify cross-tool, cross-step and cross-process dependencies that cannot be captured by the limited analysis of current SPC techniques. In order to deal with the potential large data volume, we propose to use an incremental and hierarchical statistical analysis approach.

In our proposed approach, small groups of data streams are first statistically analyzed to create intermediate summary statistics (each of which may be independently used for analysis and process control). These intermediate summary statistics are aggregated across several data streams and analyzed using other (potentially similar) statistical techniques to obtain more comprehensive results. Computation savings arise from this hierarchical evaluation, where results are reused across different time-scales, and groups of data streams, allowing large-scale analysis across many different tools, steps and processes.

At the same time, in order to drive real-time operation, the intermediate results included in these summary statistics may also individually be used to drive process control incrementally. Refinements to any control decision (made by this independent analysis) may be provided after the hierarchical analysis. Note that the granularity of this hierarchical analysis can be at multiple levels.

Figure 1:
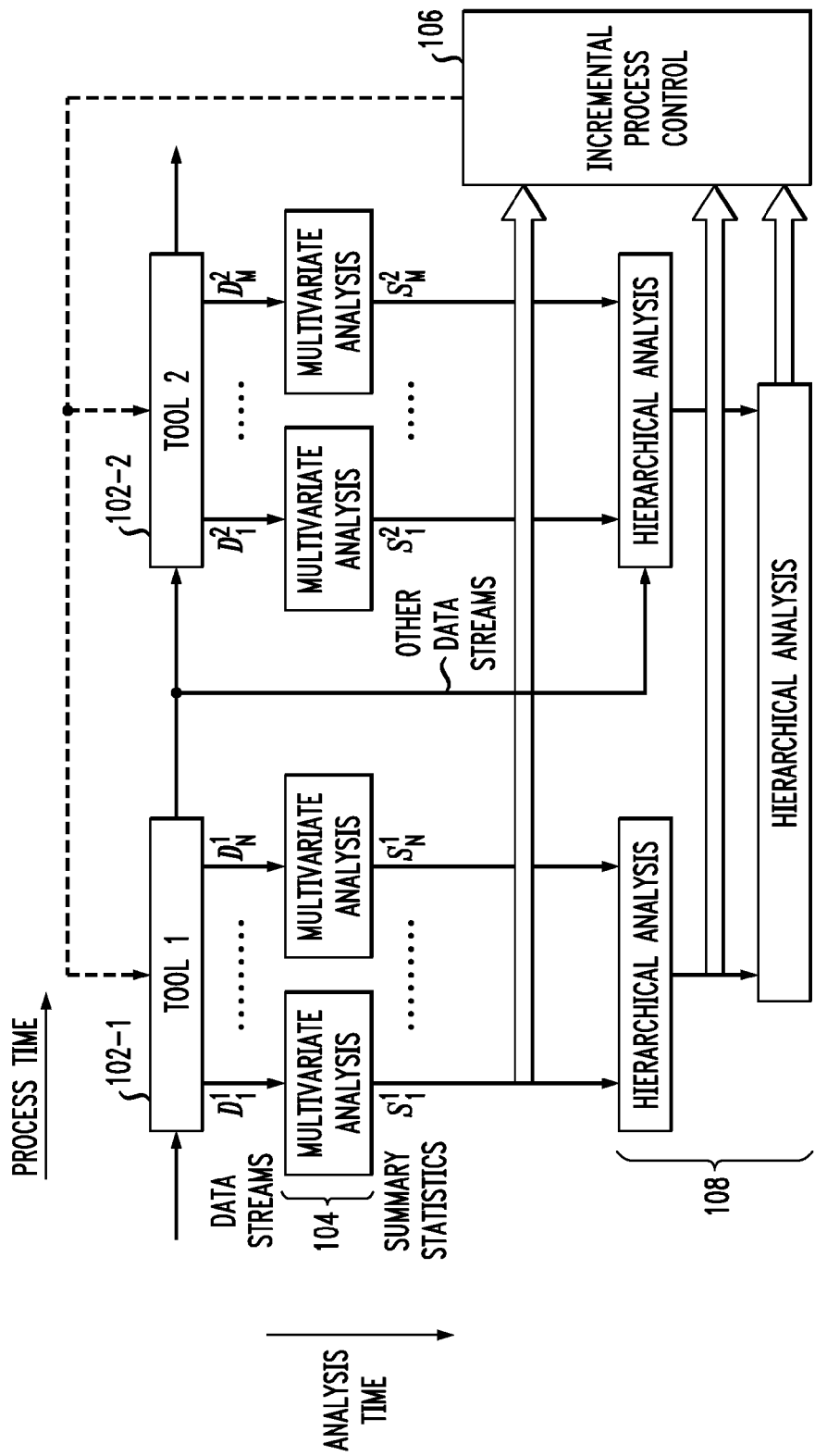
FIG. 1 illustrates a hierarchical and incremental multivariate analysis system according to an embodiment of the invention.

FIG. 1 illustrates hierarchical and incremental multivariate analysis system according to an embodiment of the invention. As may be seen in FIG. 1, in accordance with system 100, there are two tools 102-1 (tool 1) and 102-2 (tool 2) which produce N and M data streams, respectively. Of course, there could be more or less tools. Each data stream may be analyzed using multivariate analysis (intermediate analyzers 104) to create summary statistics $S_1^1$ through $S_N^1$ and $S_1^2$ through $S_M^2$, respectively.

These summary statistics may be used to drive process control 106 as soon as they are computed (this leads to incremental process control, i.e., we do not have to wait for all the analysis to complete). Additionally, these summary statistics may also be analyzed in a hierarchical structure with multiple levels (hierarchical analyzers 108) to generate new results which may then be also used to drive the process control 106. Finally, there may also be other data streams such as measurement data that may be used in this hierarchical analysis.

Based on results from the analyzers, individual and multiple aspects (components) of the processing pipeline (tools) can be controlled (e.g., adjusted) to improve performance (e.g., in a semiconductor manufacturing pipeline, increased wafer yield).

Thus, advantageously, multiple data streams are collected in the environment (e.g., a semiconductor manufacturing pipeline). Each data stream is analyzed to generate summary statistics. These summary statistics are then aggregated across the different streams in a hierarchical manner to generate new analysis results. The process control is incremental. This means that we use not just the results of the hierarchical analysis for the process control, instead we also may use the intermediate summary statistics (generated per stream) for process control. Hence, as and when any analysis results are available, they may be used for the control.

Figure 2:
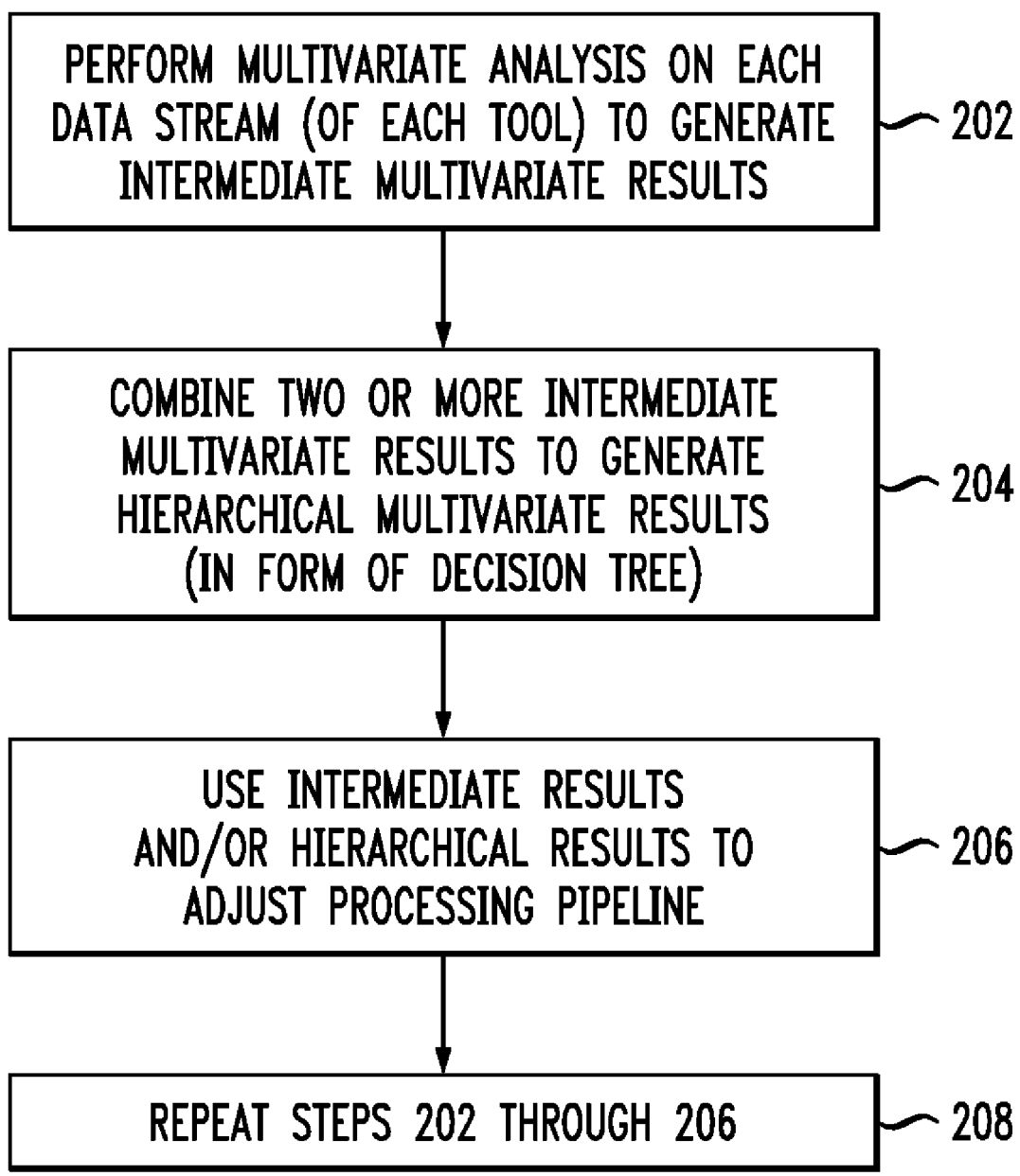
FIG. 2 illustrates a methodology for hierarchical and incremental multivariate analysis according to an embodiment of the invention.

FIG. 2 illustrates a hierarchical and incremental analysis methodology according to an embodiment of the invention. It is to be understood that methodology 200 shown in FIG. 2 is performed by system 100 of FIG. 1.

Methodology 200 performs two stages analysis stages.

In step 202 (first stage), methodology 200 performs multivariate analysis on each data stream associated with a tool to generate intermediate multivariate results. By way of example, respective raw tool parameter traces (i.e., a trace for SiCOH processing tool, a trace for annealing tool, a trace for chemical mechanical polishing or CMP tool, an example of which will be described below in the context of FIG. 3) are each analyzed using a multivariate statistical technique.

By way of one example, the multivariate statistical technique computes multiple Hoteling-T2 summary statistics per data stream. In one embodiment, this may include 12 statistical components for a CMP tool, that are partitioned into six fixed components and six variable components. These 12 components are partitioned into six fixed components and six variable components. The fixed components capture summary statistics for slowly varying parameters, while the variable components capture the summary statistics of rapidly varying parameters. The six sets correspond to the six recipe steps within the tool.

Threshold values are set to indicate parameter out-of-specification conditions. If the generated Hoteling-T2 scores lie outside these threshold values, alarms are generated (incremental results utilization). The results of this stage can lead to approximately 10% accurate prediction of wafer yield class (especially to predict wafers with bad yield).

It is to be understood that the multivariate statistical technique that is used on each data stream (tool) in order to generate a set of summary statistics can be any conventional multivariate analysis technique. By way of further example, one or more multivariate analysis techniques described in U.S. Pat. Nos. 6,442,445; 6,584,368; and 6,678,569, the disclosures of which are incorporated by reference, may be employed in step 202.

In step 204 (second stage), methodology 200 generates hierarchical multivariate results. That is, by way of example, methodology 200 can combine the time series of summary statistics (12 values per time unit, i.e., per wafer) for the CMP tool with process parameters such as pad hours and dresser hours, and builds a decision tree to analyze this data jointly.

Lastly, as shown, step 206 indicates that intermediate results (from step 202) and/or the hierarchical results (step 204) can be used to adjust the processing pipeline. Then, steps 202 through 206 can be iterated until some optimum pipeline status is achieved.

Figure 3:
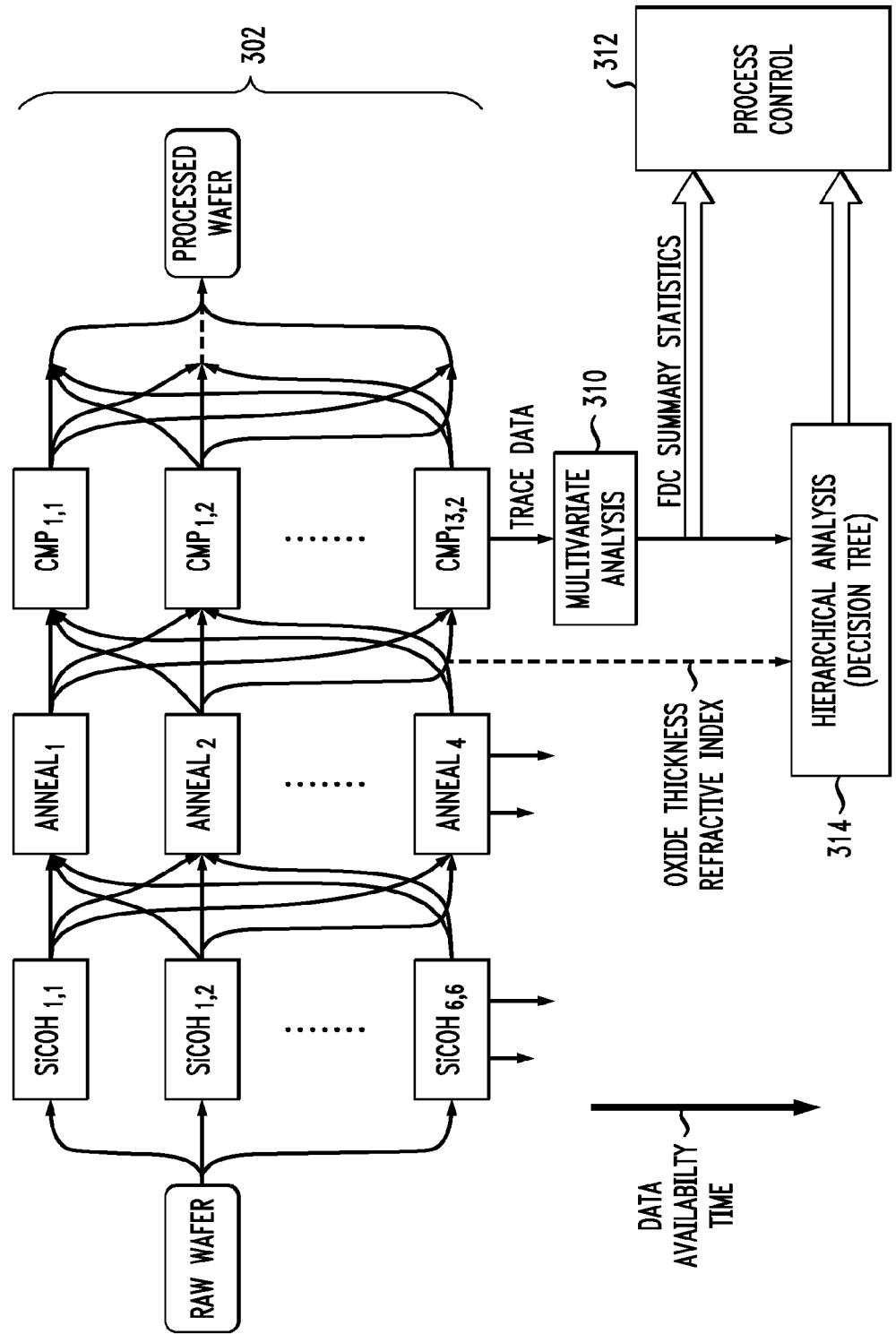
FIG. 3 illustrates a hierarchical and incremental multivariate analysis system for a chemical mechanical polishing (CMP) tool according to an embodiment of the invention.

FIG. 3 illustrates an embodiment of the invention in the context of hierarchical and incremental analysis for a CMP tool in the context of semiconductor processing pipeline 302. The first multivariate analysis 310 operates on the CMP tool trace data stream to create fault detection and classification (FDC) summary statistics. These FDC summary statistics are used for process control 312 in existing implementations by comparing each computed statistic against a fixed threshold. If any of the summary statistics exceed the threshold, the tool is assumed to be operating out-of-specification and an alarm is generated. This classification method has accuracy 10%. However, in accordance with principles of the invention, hierarchical analysis 314 advantageously combines these summary statistics with the process data and uses a decision tree based classifier to build a model to predict bad wafers.

Figure 4:
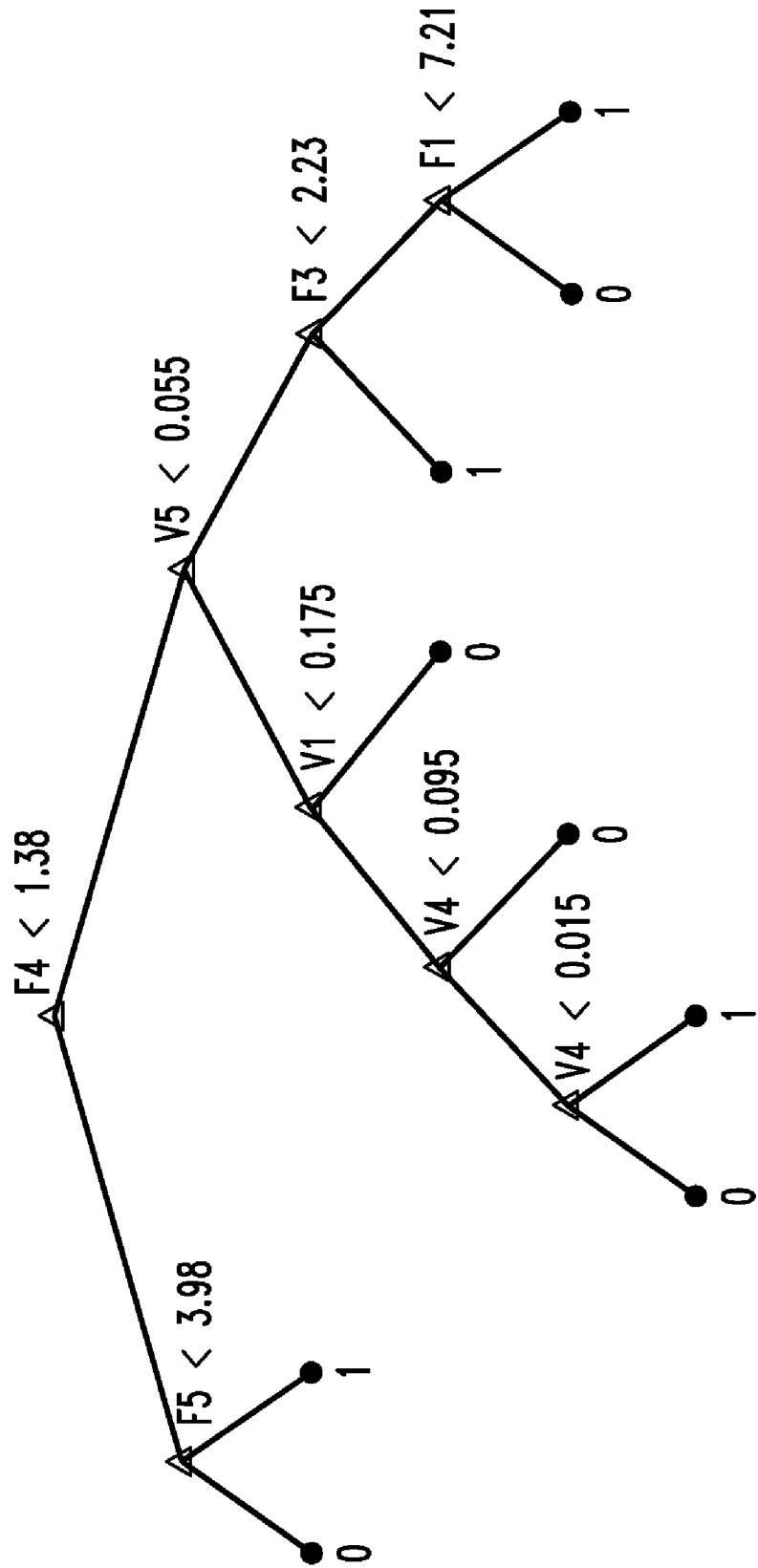
FIG. 4 illustrates a decision tree formed by a hierarchical analysis process according to an embodiment of the invention.

The resulting decision tree is shown in FIG. 4. The construction of the decision tree follows well-known classification techniques, e.g., as described in P. Domingos and G. Hulten, "Mining High-Speed Data Streams," ACM SIGKDD 2000, the disclosure of which is incorporated by reference herein. Numerical results corresponding to the classification accuracy are shown in FIG. 5.

As shown in exemplary decision tree 400 of FIG. 4, it is assumed that the same number of wafers (29) is selected from each class. Then, through 10-fold training and validation, classification performance is evaluated with this decision tree. Each node in the tree corresponds to a decision rule (e.g., is fixed component 4<1.38 at the root) with Fi corresponding to fixed component i and Vj corresponding to variable component j. The results of this second stage in terms of predicting wafer yield class are shown in table of FIG. 5. Confusion matrix 500 shows that this classifier achieves nearly 90% accuracy in terms of classifying the wafers into these two classes.

Using this hierarchical analysis, we can boost wafer yield prediction results from about 10% to around 90% achieving significant gains in performance. Note that we can perform this second stage analysis in a computationally feasible way because of the preliminary analysis already performed in the first stage (to generate the Hoteling-T2 summary statistics). Also note that the results are generated incrementally, i.e., the results of the first stage may already be used to predict wafers with bad yield (although with a low accuracy), while those generated after the second stage of the analysis may be used to refine those results. It is to be appreciated that the individual techniques used in this illustrative embodiment, i.e., Hoteling-T2 and decision trees, are generic statistical processing techniques, and may be replaced with other techniques depending on the process being controlled.

Figures 5, 6:
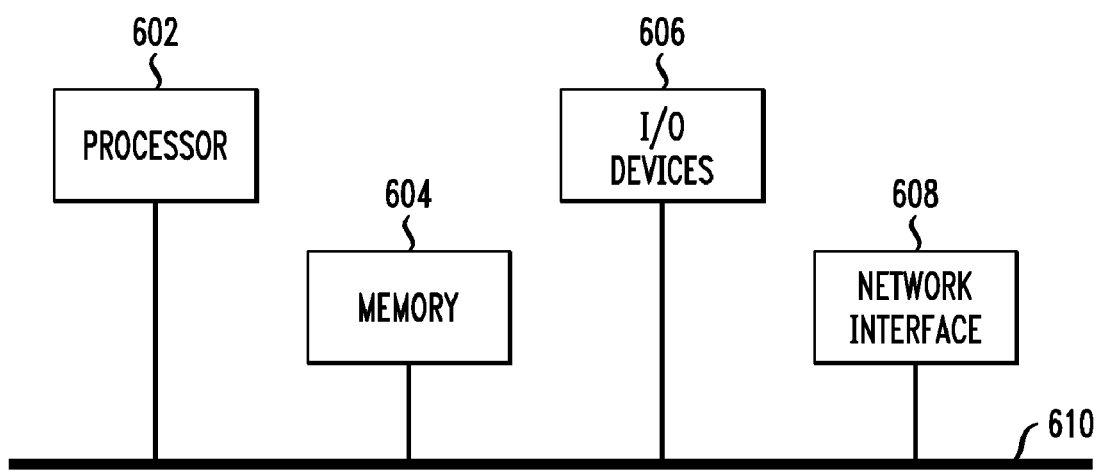
FIG. 5 illustrates a confusion matrix for a two class classification according to an embodiment of the invention.
FIG. 6 illustrates a computer system wherein techniques for performing hierarchical and incremental multivariate analysis may be implemented according to an embodiment of the invention.

Referring lastly to FIG. 6, a computer system is illustrated wherein techniques for performing hierarchical and incremental multivariate analysis may be implemented according to an embodiment of the invention. That is, FIG. 6 illustrates a computer system in accordance with which one or more components/steps of the hierarchical and incremental multivariate analysis techniques (e.g., components and methodologies described above in the context of FIGS. 1 through 5) may be implemented, according to an embodiment of the invention. It is to be understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 6 may represent intermediate analyzers 104, incremental process control 106 and hierarchical analyzers 108, described herein in the context of FIG. 1.

As shown, computer system 600 includes processor 602, memory 604, input/output (I/O) devices 606, and network interface 608, coupled via a computer bus 610 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for analyzing two or more data streams respectively generated from two or more components of a controllable process, the method comprising the steps of:
    obtaining first analysis results by performing a statistical analysis on each of a first data stream to generate first statistical results and a second data stream to generate second statistical results, the first analysis results including the first and second statistical results, individually; and
    generating second analysis results by combining at least a portion of the first statistical results with at least a portion of the second statistical results; and
    adjusting a controllable process based on both the first analysis results and the second analysis results.

2. The method of claim 1, wherein the first analysis results comprise incremental summary statistics for each of the two or more data streams.

3. The method of claim 1, wherein the second analysis results comprise hierarchical summary statistics for the two or more data streams.

4. The method of claim 3, wherein the hierarchical summary statistics for the two or more data streams are computed using a decision tree classifier.

5. The method of claim 4, wherein the decision tree is usable to adjust one or more components of the controllable process.

6. The method of claim 1, wherein the controllable process comprises a semiconductor manufacturing process.

7. The method of claim 6, wherein the semiconductor manufacturing process comprises a silicon wafer manufacturing process.

8. The method of claim 1, wherein the statistical analysis comprises a multivariate analysis.

9. An article of manufacture for analyzing two or more data streams respectively generated from two or more components of a controllable process, the article comprising a computer readable storage memory including one or more programs which when executed by a computer perform the steps of claim 1.

10. Apparatus for analyzing two or more data streams respectively generated from two or more components of a controllable process, the apparatus comprising:
a memory; and
a processor coupled to the memory and operative to:
obtain first analysis results by performing a statistical analysis on each of a first data stream to generate first statistical results and a second data stream to generate second statistical results, the first analysis results including the first and second statistical results, individually; and
generate second analysis results by combining at least a portion of the first statistical results with at least a portion of the second statistical results; and
adjust a controllable process based on both the first analysis results and the second analysis results.

11. The apparatus of claim 10, wherein the first analysis results comprise incremental summary statistics for each of the two or more data streams.

12. The apparatus of claim 10, wherein the second analysis results comprise hierarchical summary statistics for the two or more data streams.

13. The apparatus of claim 12, wherein the hierarchical summary statistics for the two or more data streams are computed using a decision tree classifier.

14. The apparatus of claim 13, wherein the decision tree is usable to adjust one or more components of the controllable process.

15. The apparatus of claim 10, wherein the controllable process comprises a semiconductor manufacturing process.

16. The apparatus of claim 15, wherein the semiconductor manufacturing process comprises a silicon wafer manufacturing process.

17. The apparatus of claim 10, wherein the statistical analysis comprises a multivariate analysis.

18. A system for analyzing two or more data streams respectively generated from two or more tools of a semiconductor processing pipeline, the system comprising:
a data storage unit for storing two or more data streams; and
a statistical analyzer coupled to the data storage unit and operative to:
obtain first analysis results by performing a multivariate analysis on each of a first data stream to generate first statistical results and a second data stream to generate second statistical results, the first analysis results including the first and second statistical results, individually; and
generate second analysis results by combining at least a portion of the first statistical results with at least a portion of the second statistical results; and
adjust at least a portion of the two or more tools of the semiconductor processing pipeline based on both the first analysis results and the second analysis results.

19. The system of claim 17, wherein the first analysis results comprise incremental summary statistics for each of the two or more data streams.

20. The system of claim 17, wherein the second analysis results comprise hierarchical summary statistics for the two or more data streams.

* * * * *